(12) United States Patent
Sempere Rodriguez et al.

(10) Patent No.: US 9,504,862 B2
(45) Date of Patent: Nov. 29, 2016

(54) DEVICE FOR EXTINGUISHING FIRES

(71) Applicant: BIG BLUE SYSTEMS, S.L., Murcia (ES)

(72) Inventors: Antonio Alejandro Sempere Rodriguez, Murcia (ES); Jose Sola Ruiz, Molina de Segura (ES); Alvaro Juan Sempere Fernandez, Molina de Segura (ES)

(73) Assignee: BIG BLUE SYSTEMS, S.L., Murcia (ES)

( * ) Notice: Subject to any disclaimer, the term of this patent is extended or adjusted under 35 U.S.C. 154(b) by 132 days.

(21) Appl. No.: 14/377,246

(22) PCT Filed: Jan. 16, 2013

(86) PCT No.: PCT/ES2013/070010
§ 371 (c)(1),
(2) Date: Aug. 7, 2014

(87) PCT Pub. No.: WO2013/117784
PCT Pub. Date: Aug. 15, 2013

(65) Prior Publication Data
US 2016/0030780 A1    Feb. 4, 2016

(30) Foreign Application Priority Data

Feb. 10, 2012  (ES) .................................. 201230204

(51) Int. Cl.
*A62C 25/00*        (2006.01)
*A62C 3/02*         (2006.01)
(Continued)

(52) U.S. Cl.
CPC ........... *A62C 3/0242* (2013.01); *A62C 3/0228* (2013.01); *A62C 8/005* (2013.01); *B64D 1/16* (2013.01)

(58) Field of Classification Search
CPC .. A62C 3/0228; A62C 8/005; A62C 3/0242; B64D 1/16

USPC ....... 169/35, 36, 53; 102/369, 370; 244/136; 239/171
See application file for complete search history.

(56) References Cited

U.S. PATENT DOCUMENTS 2,895,693 A    7/1959   Portias
3,714,987 A    2/1973   Mattson
(Continued)

FOREIGN PATENT DOCUMENTS

BE    891784       7/1982
ES    2 213 424    8/2004
(Continued)

OTHER PUBLICATIONS

International Search Report issued Mar. 21, 2013 in International (PCT) Application No. PCT/ES2013/070010.
(Continued)

*Primary Examiner* — Steven J Ganey
(74) *Attorney, Agent, or Firm* — Wenderoth, Lind & Ponack, L.L.P.

(57) ABSTRACT

A fire-extinguishing device of the type integrated into an aircraft, is for the controlled transportation and evacuation of fire-fighting material and may be activated from the aircraft while it is in flight, onto the area which is on fire. The fire-extinguishing device comprises at least one closed independent receptacle (3) filled with the fire-fighting material, housed within a container, which is fastened to the aircraft, which includes at least one collapsible outlet hatch for the at least one closed independent receptacle (3) and which, upon opening, frees the gravitational fall of the fire-fighting material. The at least one closed independent receptacle (3) has a built-in fill valve, with an anti-drainback mechanism which guarantees that the at least one closed independent receptacle (3) is leak tight. The built-in fill valve can be accessed through the at least one collapsible outlet hatch.

15 Claims, 6 Drawing Sheets

(51) Int. Cl.
*A62C 8/00* (2006.01)
*B64D 1/16* (2006.01)

(56) References Cited

U.S. PATENT DOCUMENTS

| | | | |
|---|---|---|---|
| 7,614,456 B2* | 11/2009 | Twum | A62C 3/0235 169/36 |
| 7,992,647 B2* | 8/2011 | Cordani | A62C 5/033 169/53 |
| 2003/0029507 A1 | 2/2003 | Zafra et al. | |

FOREIGN PATENT DOCUMENTS

| | | |
|---|---|---|
| ES | 2 365 237 | 9/2011 |
| FR | 1 548 733 | 12/1968 |
| FR | 2 627 391 | 8/1989 |
| WO | 2005/014394 | 2/2005 |

OTHER PUBLICATIONS

Extended European Search Report issued May 19, 2015 in corresponding European Application No. 13746421.0.

* cited by examiner

DEVICE FOR EXTINGUISHING FIRES

OBJECT OF THE INVENTION

The present invention, as described in the title of this specification, refers to a fire-extinguishing device of the type integrated into an aircraft, which is for the controlled transportation and evacuation of the fire-fighting material and which may be activated from the aircraft whilst it is in flight. Various fire-fighting materials may be used with this device, amongst which liquids such as water, retardant products such as earths and powdered or granular products, etc. may be cited as examples.

Based on this premise, the device, the object of the invention, stands out because, on the one hand, it enables larger quantities of fire-fighting material to be transported, not only using common means such as light aircraft and helicopters but, in addition, military aircraft such as cargo planes and bomber planes may be used and, on the other hand, it optimizes the effectiveness of said material, since it ensures the controlled, precise impact at a certain point in the fire, without dispersing the material used.

To this end, this volume of fire-fighting material is housed within independent globe-like receptacles, which are resistant enough to be able to endure the pressure of the material stored inside them, but which may also easily burst or break upon impact with the surface of the ground where the fire is located or which may burst or break in a controlled manner as they fall.

As already indicated, the device, the object of the invention, is applicable to fire-fighting via the use of aircraft, essentially being applicable to wildfires, without ruling out other types of fires.

Furthermore, it is worth highlighting that the application of the device, the object of the invention, is highly effective because the entire volume of the fire-fighting material contained within each receptacle impacts fully in the area on fire, without the mass of material having dispersed moments before reaching said area on fire, as is the case with other devices associated with an aircraft in which said material is dispersed before impacting the ground, which causes it to be less effective and less powerful in terms of putting the fire out.

BACKGROUND OF THE INVENTION

In the current methods for extinguishing a fire, one or some of the elements are usually removed from the fire triangle (oxygen, heat and fuel) and/or from the chain reaction thereof.

There are essentially four different methods for extinguishing a fire:
Asphyxiation: this method aims to remove the oxygen. In order to do so, blankets, earth and water etc., are usually used.
Cooling: in this case, attempts are made to reduce the temperature of the combustible materials so that they do not burn. Water is usually used to put out the fire.
Fuel dispersion or isolation: this method aims to prevent the fire from spreading by putting in place barriers, which stop it from reaching more combustible materials. Firebreaks or cutting vegetation are the methods most commonly used against the development of wildfires.
Chain reaction inhibition: this method interrupts the chain reaction using chemical substances. Chemical powder extinguishers function using this method.

In order to extinguish a fire, the "fire triangle", consisting of fuel, oxygen and heat as mentioned above, which is responsible for the combustion, must be broken or weakened by human action. It is possible to distinguish three phases when it comes to extinguishing a fire: fighting, controlling and ending the fire.

Water is the best and fastest-acting means against fire, since it cools the fuel whilst also insulating it from the air, thus removing oxygen from the fire triangle. Water should be directed towards the base of the flame. The problem with using water is that it is difficult to find it near a wildfire and transporting it to the site of the fire is also difficult.

Of the means used to extinguish wildfires, it is worth highlighting aerial means, which make it possible to quickly transport water to the fire front. Two types of plane are currently used, which differ from one another in the way they must load the water. Amphibian planes, which load the water during flight at reservoirs or protected areas of the coastline (rivers, ports, bays, etc.), and planes that load the water on the ground by means of hoses.

In addition, helicopters with hanging deposits, which are loaded with water from the ground or are submerged at a water intake point, are occasionally used. Water loading points must be relatively close to the fire in order to enable these helicopters to operate effectively.

FR-1548733-A teaches a container arranged under the fuselage of a helicopter. The container contains receptacles housing a fire-extinguishing fluid. The receptacles can be dropped from the helicopter in flight by opening an outlet hatch of the container.

U.S. Pat. No. 2,895,693-A teaches an aircraft with water filled bags within a bomb bay, whereby these bags can be dropped into a fire on the ground.

SUMMARY OF THE INVENTION

With the aim of fulfilling the objectives and avoiding the above-mentioned drawbacks, the invention proposes a fire-extinguishing device, of the type integrated into an aircraft in order to transport the fire-fighting material, whilst also enabling said material to be launched from the aircraft when it is in flight, which results in it landing in the seat of the fire.

Based on this premise, the device, the object of the invention, is characterized in that:
It comprises at least one closed independent receptacle, which is housed within a container, which includes at least one collapsible outlet hatch, the opening of which enables the receptacles loaded with fire-fighting material to fall due to gravity, thus impacting fully at the base of the fire's flames when they impact the ground, thus resulting in a highly effective, powerful method for putting out the flames. The outlet hatch is opened by means of ejection mechanisms.
The independent receptacles have built-in fill valves with a non-return mechanism, which guarantees leak-tightness once they are filled.
The independent receptacles are filled by means of hoses and motor pump units, which have a calibrated loading mouth at one end, in order to prevent the tare pressure of the independent receptacle from being exceeded. Fire hydrants installed in the warehouses and/or hangars may be used for this operation.
The container has built-in access hatches, through which the valves can be accessed from the outside, in order to facilitate the filling of the independent receptacles located within the respective container.

The container can have built-in fixation means, to enable it to be fixed to the structure of the aircraft. In a first embodiment, it may be secured to the outside of the aircraft (the fuselage, wings, etc.) or in a second embodiment, inside the same (the hold).

The container of a first embodiment comprises:

A central body with a circular cross-section according to a transverse plane;

Covering lids coupled by means of a hinged articulation at the ends of the central body, said lids forming closing elements for said central body, in which inner storage spaces for accessories and mechanisms are defined; and A collapsible hatch built into the central body, which forms part of the covering structure of said central body.

The central body of the container of the first embodiment, described herein, progressively narrows towards the free ends thereof, the covering lids of the aforementioned container comprising paraboloid bodies, the curvature of each being a continuation of a curved surface of the central body.

In the first embodiment, the fixation means for fixing the container to the aircraft structure comprise securing systems which correspond to the requirements of the associated aircraft and which are supported on a base body of a fastening harness, which is solidly fixed to the aircraft fuselage.

The fastening harness comprises:

The base body that has the junction box, which enables the opening mechanism to be operated from inside the aircraft, said base body having a built-in securing mechanism, for securing the fastening harness assembly to the aircraft in such a way that it is joined to the same.

Two attachment arms, which hold and support the first container, thus joining the harness-container assembly by means of fastening elements built into the arms.

The container of a second embodiment comprises a prismatic structure, housed within the aircraft, which is formed by various modular compartments, separated from one another by intermediate tilting plates, each one of which has the corresponding access hatch through which the fill valve of the independent receptacle is accessed from the outside.

This container of the second embodiment is further characterized in that, in the end modular compartment, the tilting plate acts as a front outlet hatch for the independent receptacles, which are released when the intermediate tilting plates are folded down.

The container has built-in iron fittings for its anchors, located in the upper corners and in the base, which will be adapted to the characteristics of the aircraft hold.

By way of example, the fixation means of the container of the second embodiment, located inside the aircraft, comprise:

Straps, which fasten the container to the floor of the aircraft by means of hooking mechanisms, the straps being passed through several openings in several iron fittings, established against the upper corners of the prismatic structure of the cited container.

Locking mechanisms, which immobilize the container at its base against the surface of the aircraft floor.

In the second embodiment, the compartments of the container comprise a modular structure, which may be partitioned with coupling means between them.

In turn, the modular compartments of the container of the second embodiment have built-in presence detectors and/or load detectors for the independent receptacles.

The independent receptacles have a flexible, elastic structure in the shape of a globe, which is strong enough to transport therein elements capable of putting out the fire; essentially liquid fluids.

Moreover, the anchors of the container of the first embodiment make it possible to unhook the container before landing the aircraft, if necessary.

In addition to the container of the second embodiment having a modular structure as described above, it may also be foldable, detachable and/or stackable, in order to facilitate the empty transportation thereof to the area of use as well as reduce storage space.

The following advantages are just some of the advantages achieved by the device, the object of the invention:

Enlargement of the air fleet. It provides more means to fight wildfires. The military air fleets of each country (used for both combat and transportation) can be converted into effective, fast-acting means against fires.

It is faster, providing increased speed in fighting wildfires. In using faster planes, the response time is considerably shorter.

It increases the number of liters per hour. The volume of water and retardant materials, which can be used to fight fire, increases since the number of aircraft is greater, as is the speed and transportation load capacity thereof, thus increasing the amount of fire-fighting material.

It improves personnel conditions. The pilots are at less risk when releasing the fire-fighting material from a greater height, thus avoiding both the flames and turbulence caused by the fire, also reducing the risk posed to the firefighters and forest brigade teams, since it makes it possible to extinguish the fire at a greater distance from the same, thus meaning personnel are not exposed to the dangers of areas which are difficult to access or escape.

It is ecologically and environmentally friendly. It reduces the areas burnt by the fire, in such a way that by using the device, the object of the invention, the quality of response and the speed thereof are improved. It also facilitates prevention, since it makes it possible to cool down areas, which have not yet been devastated. Therefore, ecological and environmental protection is also increased.

It increases firefighting time. It increases the intervention time frame against a wildfire, since it may be used in adverse environmental conditions (harsh landscape, very dense vegetation, strong winds, excessively high flames or intense heat being given off) or at night, without high risk of accidents for aerial personnel.

It increases the number of airports that can be used for the purposes of fighting wildfires. It increases the geographical coverage and protection areas, since it successfully increases the number of airports and air bases that may be used.

It makes better use of water. By using the device, the object of the invention, the water used to fight the fire gives better performance, in such a way that it is possible to benefit from the resources available to a much greater extent. In successfully making the water enter the base of the flames directly, water usage is reduced and the power and effectiveness in putting out fires increases substantially.

In order to facilitate a better understanding of this specification, a set of figures is included below as an integral part thereof, in which the object of the invention is represented by way of illustrative and non-limiting examples.

DESCRIPTION OF AN EXEMPLARY EMBODIMENT OF THE INVENTION

Figure 1:
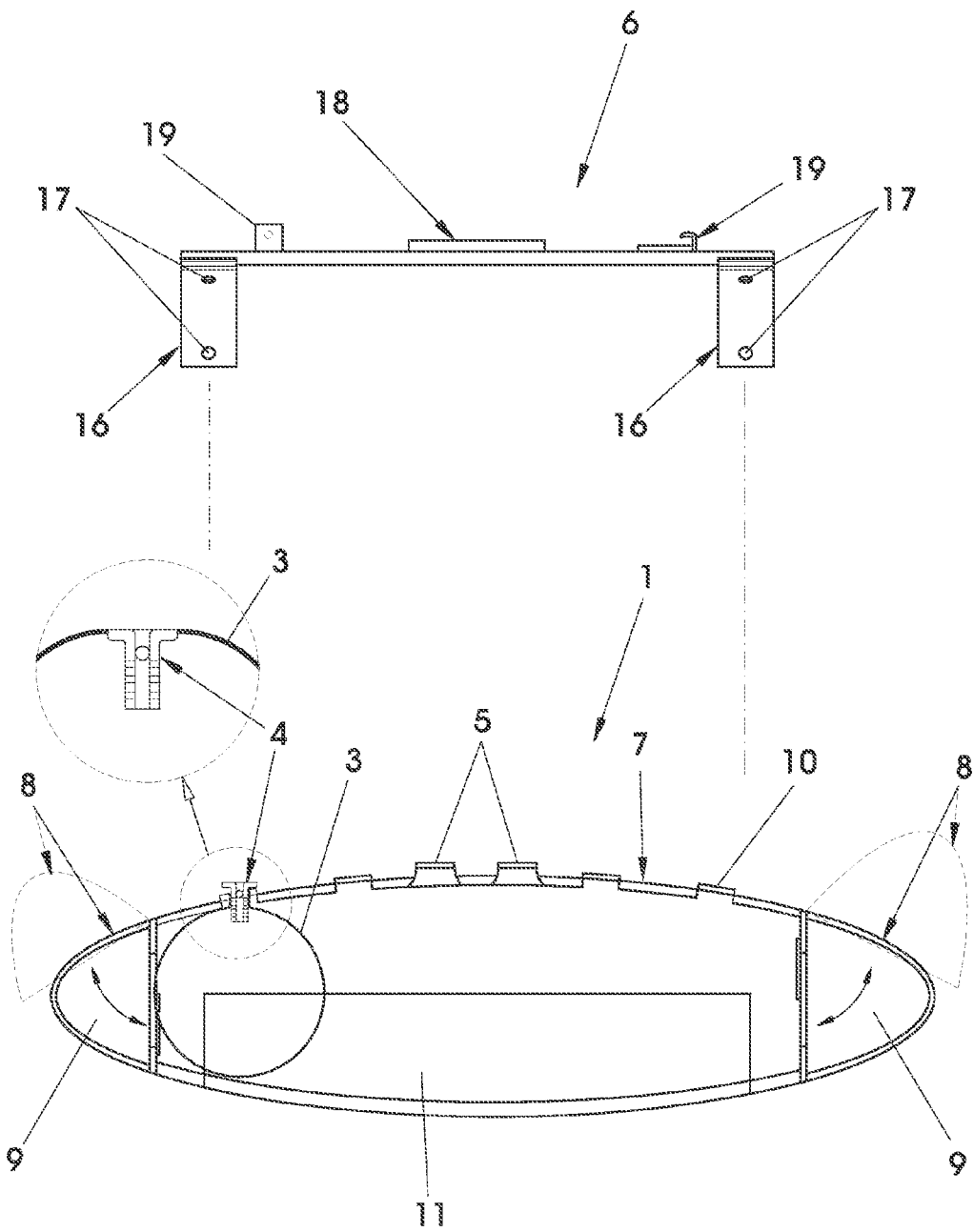
FIG. 1 is an elevation view of the fire-extinguishing device, the object of the invention. It shows a first embodiment in which a first container of the device is secured to an outer portion of the fuselage of an aircraft, by means of a fastening harness.
Figure 2:
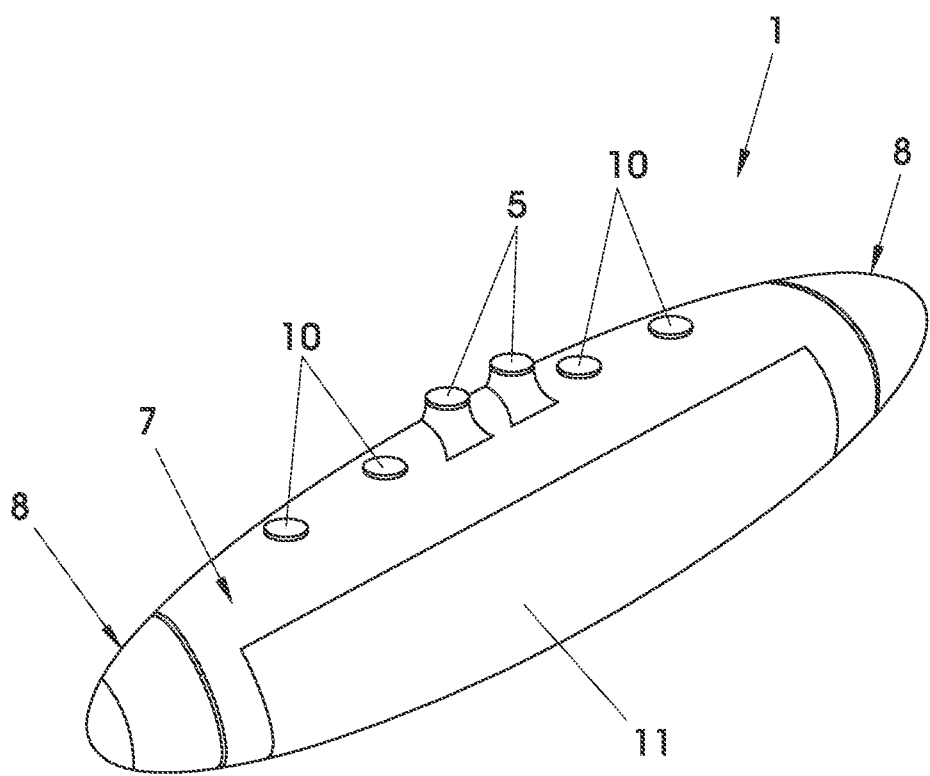
FIG. 2 is a perspective view of the container (1) represented in the FIG. 1.
Figure 3:
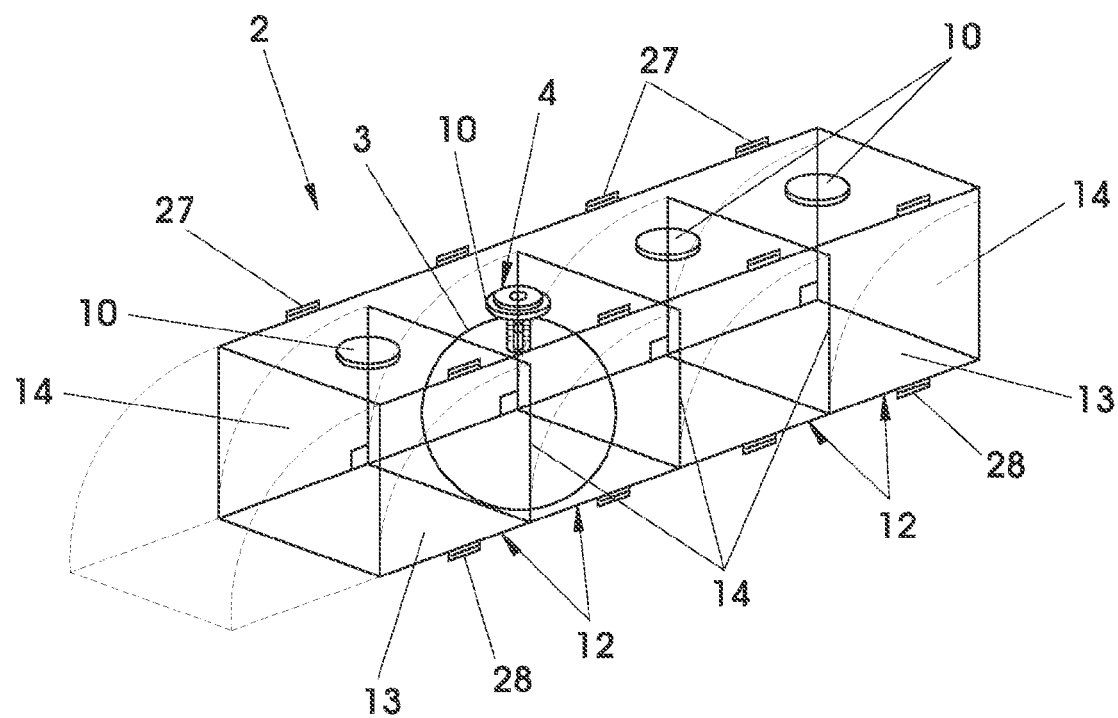
FIG. 3 is a perspective view of the fire-extinguishing device, according to a second embodiment of the invention. In this case, a second container (2) is fixed to an inner portion of the aircraft via fastening means.
Figure 4:
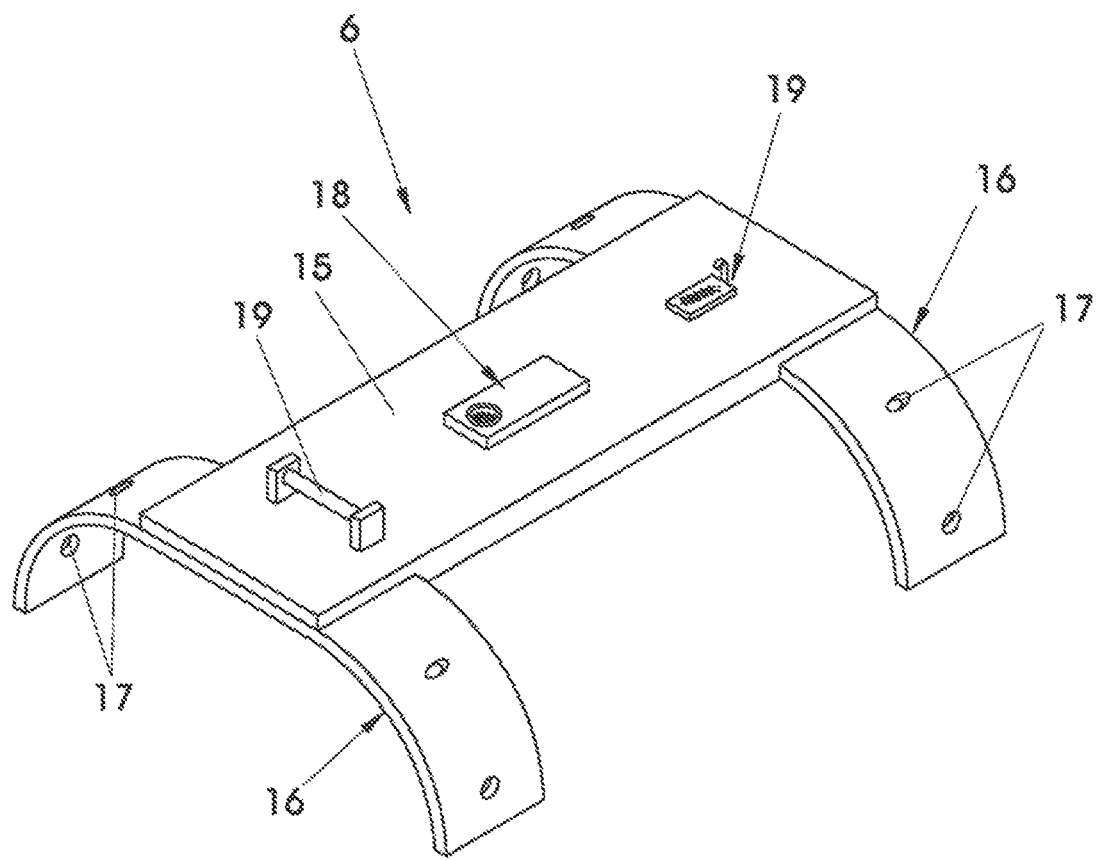
FIG. 4 is a perspective view of the fastening harness, constituting the securing means of the first container in the first embodiment to the outer portion of the aircraft fuselage.
Figure 5:
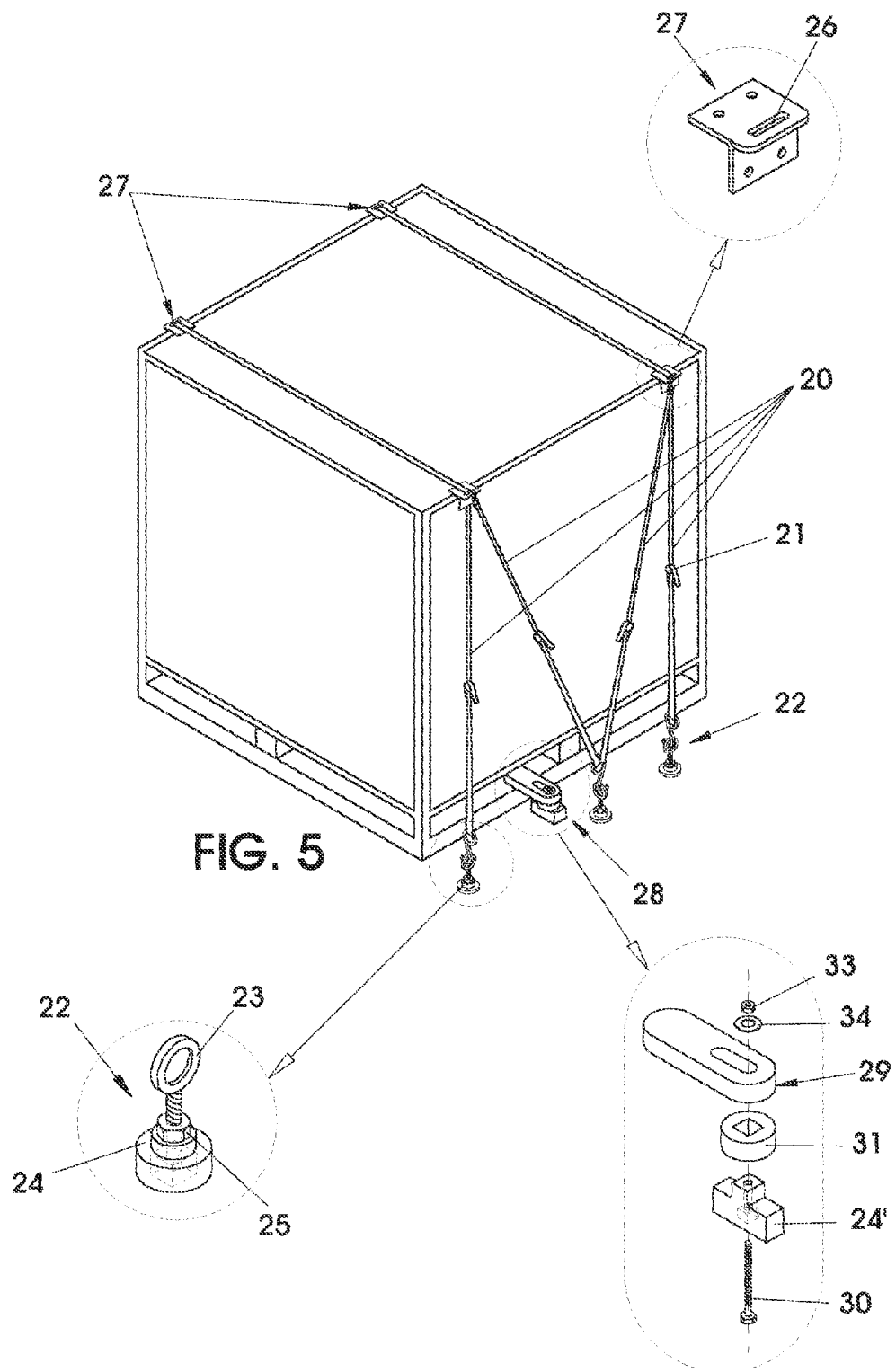
FIG. 5 is a perspective view of the device according to the second embodiment, wherein a fastening means for fastening the container of the second embodiment is detailed by way of example.
Figure 6:
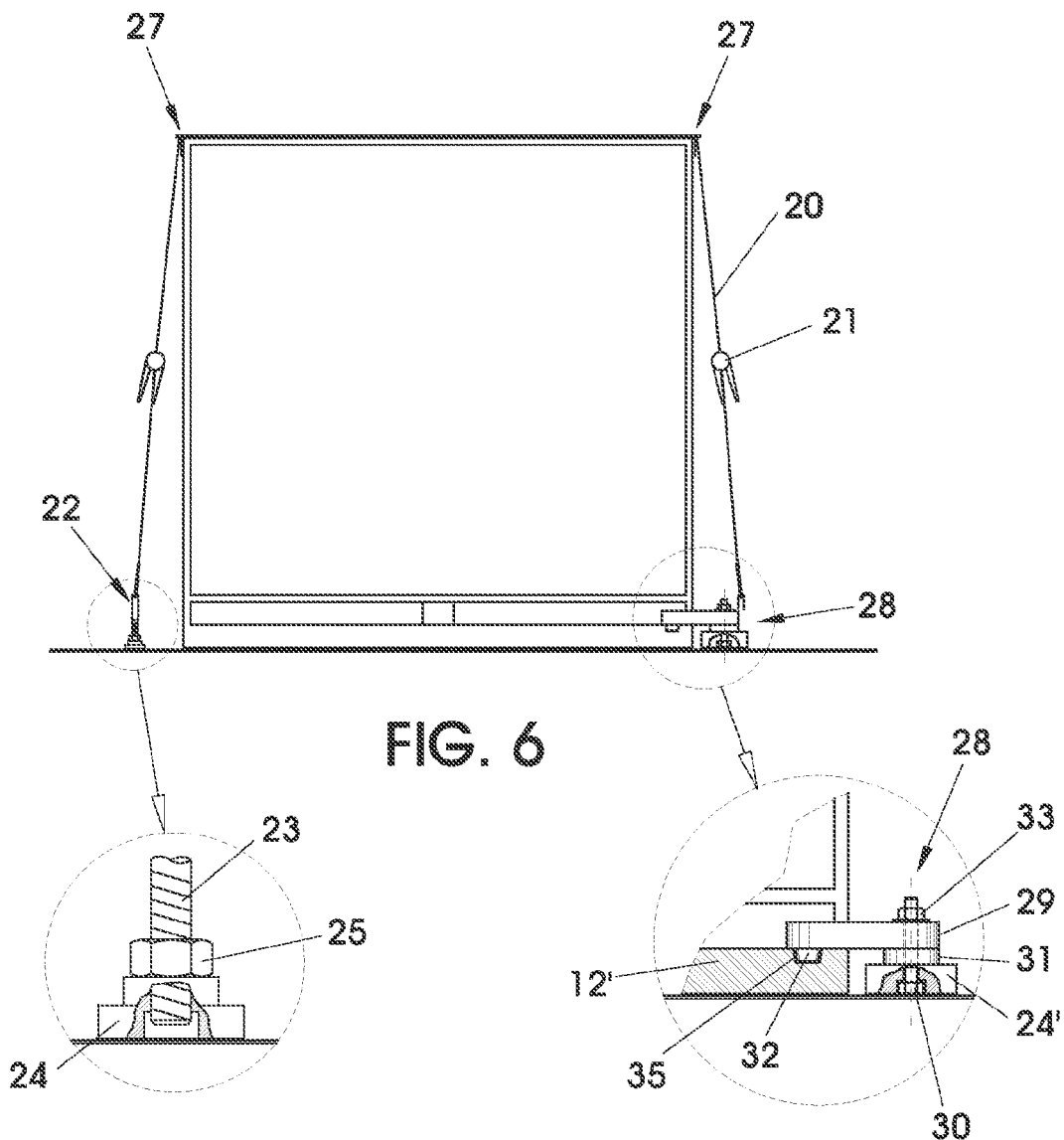
FIG. 6 is a cross-section, in which a portion of the fastening means used to fasten the container of the second embodiment of the device, the object of the invention, is shown in detail and associated with the use described in FIG. 5.

Regarding the numbering adopted in the figures, the fire-extinguishing device includes the following nomenclature used in the description:
1. First container or external container
2. Second container or hold container
3. Independent receptacles
4. Fill valve
5. Mechanism connectors
6. Fastening harness
7. Central body
8. Covering lids
9. Inner spaces
10. Access hatches
11. Lower collapsible hatch
12. Modular compartments
13. Bases
14. Tilting plates
15. Base body
16. Attachment arms
17. Fixation points
18. Central junction box
19. Securing mechanism
20. Straps
21. Ratchet mechanism
22. Hooking mechanisms
23. Ring
24. Static support
24'. Static support
25. Locknut
26. Openings
27. Iron fittings
28. Attachment mechanism
29. Flat grooved piece
30. Screw
31. Wedge
32. Lower lug
33. Nut
34. Washer
35. Perforation The device, the object of the invention, comprises:

A first or external container (1) or a second or internal container (2), inside which one or various independent globe-shaped receptacles (3) are housed, which are filled with a fire-fighting material, these independent receptacles (3) having a built-in fill valve (4) for filling them with fire-fighting material, in such a way that when the independent receptacles (3) are filled with fire-fighting material, these valves (4) ensure that the receptacle is leak tight, thus preventing the fire-fighting material from spilling out.

Various fire-fighting materials may be used with this device, including liquids such as water, retardant products such as earths, powdered or granular products, etc.

In a first embodiment of the invention, the container (1) is fixed to the fuselage outside the aircraft, by means of a fastening harness (6), whilst in a second embodiment the container (2) is fixed inside the aircraft by means of fastening means arranged on an upper and/or lower plane, as required.

The container (1) of the first embodiment comprises a central body (7) with a circular cross-section according to a transverse plane, which progressively narrows towards the ends thereof, said ends being coupled through articulations such that they correspond to covering lids (8), determined by paraboloid bodies, the curvature of each being a continuation of a curved surface of the central body (7).

The covering lids (8) define inner spaces (9) in which to house the various necessary accessories and mechanisms.

In the first embodiment, the central body (7) of the container (1) has the mechanism connectors (5) built into its upper portion, for connecting the junction box of the fastening harness (6), which is in turn fixed to the aircraft fuselage. This central body (7) has built-in access hatches (10), in order to access the fill valves (4) for filling the independent receptacles (3), housed, as shown, within the central body (7) of the container (1) of the first embodiment of the invention.

This central body (7) has a built-in lower collapsible hatch (11), upon which the independent receptacles (3) full of fire-fighting material are, in principle, supported in such a way that, in order to release the same with the aim of putting out a fire, this lower collapsible hatch (11) is opened, causing the independent receptacles (3) to fall, due to gravity and/or due to assistance by an ejection mechanism, impacting fully in a selected point in the area on fire.

The fastening harness (6) of the first embodiment of the invention comprises a base body (15) and two attachment arms (16) which hold the container (1), said attachment arms (16) having built-in conventional fixation points (17) which enable the harness and the container to be joined together, although this fixing may be removed in flight in order to release the container (1), if necessary.

The base body (15) has a central junction box (18) which enables the operation of the container mechanism from inside the aircraft.

In turn, the base body (15) has a built-in securing mechanism (19), which serves to join the fastening harness (6) to the outside of the aircraft.

The container (2) of the second embodiment comprises a prismatic structure formed by various modular compartments (12), each one having the respective access hatch (10), through which one of the fill valves (4) is accessed from the outside, in order to facilitate the filling of the independent receptacles (3) housed inside these modular compartments (12).

In this second embodiment of the invention, the independent receptacles (3), which contain the fire-fighting material, are supported on bases (13) of these modular compartments (12), which are separated by means of tilting plates (14), which when folded down, enable the independent receptacles (3) to successively move towards one of the end compartments (12), where the tilting plate (14) acts as an outlet hatch to the outside for said independent receptacles (3) loaded with fire-fighting material.

Thus, the independent receptacles (3) successively fall through the outlet hatch due to gravity and/or due to assistance by an ejection mechanism, into the seat of the fire.

It must be pointed out that the bases (13) of the compartments (12) have been adapted so that they can be handled during loading using conventional means such as trolleys, forklifts, armored vehicles, cranes, etc.

For the second embodiment of the invention, a possible fastening and attachment system inside the aircraft would be formed by: straps (20) which fasten the container (2) to the floor of the aircraft by means of hooking mechanisms (22) formed by a ring (23) threaded on a static support (24) fixed to the floor of the aircraft. The ring (23) is blocked by means of a lock nut (25) in order to prevent it from becoming loose.

The straps (20) run through openings (26) established in iron fittings (27) arranged in the upper area of the prismatic structure of the container (2). It must be pointed out that ratchet mechanisms (21) have been built into the straps (20) in order to tense these straps as required.

The fastening means of the second embodiment of the invention are complemented by attachment mechanisms (28) of the base (13) of the container (2). Each one of the attachment mechanisms (28) has a built-in flat grooved piece (29), through which a screw (30) passes, the head of which is housed in a static support (24') fixed to the floor of the aircraft. The aforementioned attachment mechanism (28) is, in turn, complemented by a wedge (31), where part of the flat grooved piece (29) is supported, which has a built-in lower lug (32), which fits into a perforation (35) of the bases (13) of the container (2). The pressure exerted by the flat grooved pieces (29) against the bases (13) of the container (2) is ensured by a nut (33) coupled to the screw (30), with a washer (34) inserted therein.

A signal circuit and a connector, which are compatible with the aircraft, are incorporated into both embodiments of the invention, in such a way that it may be operated from the cabin.

The invention claimed is:

1. A fire-extinguishing device for integration into an aircraft, for housing a fire-fighting material to put fire out via activation from the aircraft in flight, giving rise to the fire-fighting material falling towards a seat of the fire, the fire-extinguishing device comprising:
 a container (1, 2); and
 at least one closed independent receptacle (3), housed within the container (1, 2), the container (1, 2) including at least one collapsible outlet hatch (11, 14) for the at least one closed independent receptacle (3) and an opening of which allows a fall of the at least one closed independent receptacle (3) loaded/filled with the fire-fighting material;
 wherein:
 the at least one closed independent receptacle (3) has a built-in fill valve (4) that is hermetically sealed once the at least one closed receptacle (3) has been filled; and
 the container (1, 2) has at least one built-in access hatch (10) arranged in such a way that the at least one built-in access hatch (10) corresponds with the built-in fill valve (4) of the at least one closed independent receptacle (3), in order to facilitate filling of the at least one closed independent receptacle (3) located within the container (1, 2).

2. The fire-extinguishing device according to claim 1, wherein the container (1, 2) has means for fixing the container (1, 2) to the aircraft structure.

3. The fire-extinguishing device according to claim 2, wherein the container (1) comprises:
 a central body (7) with a circular cross-section according to a transverse plane; and
 covering lids (8) coupled by an articulated hinge at ends of the central body (7), the covering lids (8) constituting closing elements for the central body (7) and in which inner spaces (9) are defined for storing accessories and mechanisms;
 the at least one built-in access hatch (10) being constituted by a lower collapsible hatch (11) built into the central body (7) and forming part of a surrounding structure of the central body (7).

4. The fire-extinguishing device according to claim 3, wherein the central body (7) of the container (1) progressively narrows towards free ends thereof.

5. The fire-extinguishing device according to claim 4, wherein the covering lids (8) of the container (1) comprise paraboloid bodies, a curvature of each being a continuation of a curved surface of the central body (7).

6. The fire-extinguishing device according to claim 5, wherein the means for fixing the container (1) to the aircraft structure comprise mechanism connectors (5) to a central junction box (17) built into a fastening harness (6) externally fixed to the outside of the aircraft.

7. The fire-extinguishing device according to claim 6, wherein the fastening harness (6) comprises:
 a base body (15) which has the central junction box (18) in which the mechanism connectors (5) of the container (1) are connected, the base body (15) having a built-in securing mechanism (19) for attaching the fastening harness (6) to the outside of the aircraft; and
 two attachment arms (16) which hold the container (1), the two attachment arms (16) having built-in fixation points (17) for fixing to the container (1), thereby joining the fastening harness (6) and the container (1) together.

8. The fire-extinguishing device according to claim 4, wherein the means for fixing the container (1) to the aircraft structure comprise mechanism connectors (5) to a central junction box (17) built into a fastening harness (6) externally fixed to the outside of the aircraft.

9. The fire-extinguishing device according to claim 8, wherein the fastening harness (6) comprises:
 a base body (15) which has the central junction box (18) in which the mechanism connectors (5) of the container (1) are connected, the base body (15) having a built-in securing mechanism (19) for attaching the fastening harness (6) to the outside of the aircraft; and
 two attachment arms (16) which hold the container (1), the two attachment arms (16) having built-in fixation points (17) for fixing to the container (1), thereby joining the fastening harness (6) and the container (1) together.

10. The fire-extinguishing device according to claim 3, wherein the means for fixing the container (1) to the aircraft structure comprise mechanism connectors (5) to a central junction box (17) built into a fastening harness (6) externally fixed to the outside of the aircraft.

11. The fire-extinguishing device according to claim 10, wherein the fastening harness (6) comprises:

a base body (15) which has the central junction box (18) in which the mechanism connectors (5) of the container (1) are connected, the base body (15) having a built-in securing mechanism (19) for attaching the fastening harness (6) to the outside of the aircraft; and two attachment arms (16) which hold the container (1), the two attachment arms (16) having built-in fixation points (17) for fixing to the container (1), thereby joining the fastening harness (6) and the container (1) together.

12. The fire-extinguishing device according to claim 2, wherein the means for fixing the container (1) to the aircraft structure comprise mechanism connectors (5) to a central junction box (17) built into a fastening harness (6) that is arranged to be externally fixed to the outside of the aircraft.

13. The fire-extinguishing device according to claim 12, wherein the fastening harness (6) comprises:

a base body (15) which has the central junction box (18) in which the mechanism connectors (5) of the container (1) are connected, the base body (15) having a built-in securing mechanism (19) for attaching the fastening harness (6) to the outside of the aircraft; and two attachment arms (16) which hold the container (1), the two attachment arms (16) having built-in fixation points (17) for fixing to the container (1), thereby joining the fastening harness (6) and the container (1) together.

14. The fire-extinguishing device according to claim 2, wherein:

the at least one closed independent receptacle (3) includes a plurality of closed independent receptacles (3);

the at least one built-in access hatch (10) includes a plurality of built-in access hatches (10);

the container (2) comprises a prismatic structure arranged to be housed within the aircraft, the prismatic structure being formed by various modular compartments (12) separated by tilting plates (14), each having one of the plurality of built-in access hatches (10) in order to provide access to the built-in fill valve (4) of a corresponding one of the plurality of closed independent receptacles (3) from outside; and one of the modular compartments (12) is an end modular compartment (12) in which one of the tilting plates (14) acts as a front outlet hatch for the plurality of closed independent receptacles (3) to fall in cascade when the tilting plates (14) are folded down.

15. The fire-extinguishing device according to claim 14, wherein the means for fixing the container (2) to the aircraft structure comprise:

straps (21) for fastening the container (2) to a floor of the aircraft by a hooking mechanism (22), the straps (20) passing through openings (26) in iron fittings (27) secured against upper corners of the prismatic structure of the container (2); and attachment mechanisms (28) for immobilizing the container (2) by bases (13) thereof against a surface of the floor of the aircraft.

* * * * *